(12) United States Patent
Reindl

(10) Patent No.: US 7,026,977 B2
(45) Date of Patent: Apr. 11, 2006

(54) METHOD OF AND APPARATUS FOR ACQUIRING DATA OF DYNAMIC PHYSICAL PROCESSES VIA A RADIO LINK

(76) Inventor: Leonhard Reindl, Leibnizstrasse 28, D-38678 Clausthal-Zellerfeld (DE)

( * ) Notice: Subject to any disclaimer, the term of this patent is extended or adjusted under 35 U.S.C. 154(b) by 434 days.

(21) Appl. No.: 10/440,402

(22) Filed: May 19, 2003

(65) Prior Publication Data
US 2003/0214419 A1 Nov. 20, 2003

Related U.S. Application Data

(63) Continuation of application No. PCT/EP01/13359, filed on Nov. 19, 2001.

(30) Foreign Application Priority Data
Nov. 17, 2000 (DE) ................ 100 57 059

(51) Int. Cl.
*B60C 23/00* (2006.01)
*G01S 13/00* (2006.01)
*B60T 8/00* (2006.01)

(52) U.S. Cl. .............. 342/71; 340/445; 340/870.01; 340/447

(58) Field of Classification Search ............. 342/71; 340/442, 445, 447, 870.01, 941
See application file for complete search history.

(56) References Cited
U.S. PATENT DOCUMENTS 4,074,227 A * 2/1978 Kalmus ............... 340/447
4,137,520 A * 1/1979 Deveau ............... 340/447
4,609,905 A 9/1986 Uzzo
6,087,930 A 7/2000 Kulka et al.
6,369,712 B1 * 4/2002 Letkomiller et al. ...... 340/447

FOREIGN PATENT DOCUMENTS

| DE | 196 21 354 | 12/1997 |
|---|---|---|
| DE | 196 48 531 | 2/1998 |
| DE | 197 02 768 | 4/1998 |
| DE | 19807004 | 9/1999 |
| EP | 1002669 | 5/2000 |
| GB | 2098430 | 11/1982 |
| WO | WO 96/33423 | 10/1996 |
| WO | WO 02/40331 A1 * | 5/2002 |

* cited by examiner

Primary Examiner—Ian J. Lobo
(74) Attorney, Agent, or Firm—Smith, Gambrell & Russell

(57) ABSTRACT

For acquiring data of dynamic physical processes via a radio link, a transponder antenna (17) is excited by an electromagnetic exciting wave at the resonance frequency of the transponder antenna (17), and a back-scattered electromagnetic sensor wave which is modulated by a sensor (16) having an electrical impedance depending on the data to be acquired is received and analyzed. The sensor (16) is directly connected to the transponder antenna (17) such that the sensor changes the electrical impedance of the transponder antenna (17) with every variation of the data to be acquired. The electromagnetic wave which is back-scattered by the transponder antenna (17) is received as the sensor wave at the same time as the transponder antenna (17) is excited by the exciting wave.

30 Claims, 1 Drawing Sheet

METHOD OF AND APPARATUS FOR ACQUIRING DATA OF DYNAMIC PHYSICAL PROCESSES VIA A RADIO LINK

CROSS REFERENCE TO RELATED APPLICATIONS

This application is a continuation of International Application PCT/EP01/13359 with an International Filing Date of Nov. 19, 2001 and claiming priority to co-pending German Patent Application No. 100 57 059.3 entitled "Verfahren und Vorrichtung zur Messwertüberwachung durch Frequenzanalyse von modulierter Rückstreuung", filed on Nov. 17, 2000.

FIELD OF THE INVENTION

The present invention generally relates to a method and an apparatus for acquiring data of dynamic physical processes via a radio link. The present invention relates to wireless reading out a sensor to acquire data of a dynamic physical process which may also be referred to as measurement values. Especially, the present invention relates to such methods and apparatuses in which neither the sensor including the time-varying electrical impedance nor the transponder antenna associated with the sensor include an own power supply to produce the sensor wave which encodes the data to be acquired. Such a power supply could be designed as of a line to an electrical energy supply net or in the form of batteries. Such a passive radio sensor facility can advantageously be used in various technical environments, especially on rotating parts or differently moving parts. An especially interesting area of application of the invention, however, is the measurement of the strain or deformation of a tire element of a tire of a vehicle during its contact with the road while the vehicle is moving. From a measured strain curve the coefficient of friction between the tire and the road can be estimated. This concerns monitoring the frictional contact of the tire to the road in order to prevent the vehicle from leaving the road when driving through curves, when decelerating or when accelerating. In particular, monitoring the coefficient of friction is of interest considering the risk of water or ice formation on the road in order to output a warning signal to the driver of the motor vehicle, or to directly control the steering element or to intervene in the drive or the brakes of the vehicle.

BACKGROUND OF THE INVENTION

A method and an apparatus for acquiring data of dynamic physical processes via a radio link are known from German patent application No. DE 198 07 004 A1. This document also relates to the special problems of the measurement of the strain of a tire element during the contact with the road while the corresponding vehicle is moving. To separate the sensor wave from the exciting wave, a time domain division between the exciting wave and the sensor wave is used. The remote transponder unit, also referred to as a radio sensor, includes a sensor, a transponder antenna, and an energy storing means which stores energy out of the exciting wave until the exciting wave and all environmental echoes are faded away. Then the sensor wave is generated by using the stored energy. The sensor wave encodes the information of the measurement values to be monitored. For energy storing a well known surface acoustic wave device is used which gives back one or several time delayed echoes of the signal which is applied to it. Using these delayed signals, the time domain division between the exciting wave and the sensor wave is implemented. One of the time delayed signals is controlled by a sensor impedance which is sensitive to the measurement value. The instantaneous reflection coefficient of the transponder antenna is not changed by the sensor but the amplitude and phase of one or more of the delayed re-emitted signals is changed. To assure the time domain division the exciting wave must be a pulsed one with a time length less than the storage time, or a so called FMCW-signal (frequency modulated continuous wave) which changes its frequency as a function of time so that the sensor wave differs in frequency from the actual exciting wave. A continuous wave (CW) signal containing one single frequency could not be used because this would destroy the time domain division. To uphold the time domain division between the exciting wave and the sensor wave a very fast sampling has to be performed in the receiver unit, which may be much faster than the sampling necessary to resolve the dynamics of the measurement values.

SUMMARY OF THE INVENTION

The present invention relates to a method of acquiring data of dynamic physical processes via a radio link. The method includes the steps of arranging a sensor having an electrical impedance which depends on the data to be acquired, arranging a transponder antenna having an electrical impedance, connecting the sensor directly to the transponder antenna such that the sensor changes the electrical impedance of the transponder antenna with every variation of the data to be acquired, exciting the transponder antenna by an electromagnetic exciting wave at the resonance frequency of the transponder antenna to produce an electromagnetic wave being back-scattered by the transponder antenna and being modulated by the sensor, receiving the electromagnetic wave being back-scattered by the transponder antenna at the same time as the transponder antenna is excited by the electromagnetic exciting wave, and analyzing the electromagnetic wave being back-scattered by the transponder antenna with respect to the modulation by the sensor.

The present invention also relates to a apparatus for acquiring data of dynamic physical processes via a radio link. The apparatus includes a transmitter antenna, a transponder antenna, a sensor, a receiver antenna and an analysis unit. The transmitter antenna is designed and arranged to emit an electromagnetic exciting wave. The transponder antenna has an electrical impedance, and it is designed and arranged to receive the exciting wave. The sensor has an electrical impedance depending on the data to be acquired. The sensor is directly connected to the transponder antenna in a way that the sensor changes the electrical impedance of the transponder antenna with every variation of the data to be acquired. The receiver antenna is designed and arranged to receive a back-scattered electromagnetic sensor wave being modulated by the sensor at the same time as the transmitter antenna emits the exciting wave. The analysis unit is designed and arranged to analyze the received sensor wave.

The present invention also relates to a system for determining the deformation of a rotating tire of a motor vehicle. A transmitter element is designed and arranged to emit an electromagnetic exciting wave. A transponder element has an electrical impedance, and it is designed and arranged to receive the exciting wave. A sensing element has an electrical impedance depending on the data to be acquired. The sensing element is directly connected to the transponder antenna in a way that the sensing element changes the electrical impedance of the transponder element with every variation of the data to be acquired. A receiver element is designed and arranged to receive a back-scattered electromagnetic sensor wave being modulated by the sensing element approximately at the same time as the transmitter element emits the exciting wave. An analysis unit is designed and arranged to analyze the received sensor wave.

The novel method, apparatus and system are more simple, no energy storing unit is required, and also a continuous wave (CW) exciting wave having one single frequency can be used. With the novel method, apparatus and system, a sampling rate which is only necessary to resolve the dynamics of the measurement value is sufficient. On the other hand, the invention presented here is restricted to measurement tasks in which the measurement values have a sufficient high dynamic variation in time to produce a sufficient high frequency shift between the exciting wave and the sensor wave which are in the following also referred to as the read-out signal and the sensor signal.

With the novel method and apparatus, the time-varying electrical impedance of the sensor is connected directly to the transponder antenna, or even is an integrated part of the antenna itself. The physical process which is to be monitored by acquiring the data affects the sensor element, for instance due to a deflection, and thus changes the value of the electrical impedance. Thus, the reflection properties of the transponder antenna, like the radar cross section and the phasing of the reflected signal, change as well and with the same time characteristic as the physical process which is to be monitored.

The transponder antenna scatters back the electromagnetic read-out signal like a mirror scatters back incoming light, and like a mirror the transponder unit of the invention may be a passive one. Because of geometrical conditions, the amplitude of the sensor signal is far smaller than the amplitude of the read-out signal and also far smaller than many other environmental echoes. To distinguish the sensor signal from the read-out and all other interfering signals, the physical value to be measured must show a characteristic variation in time which produces a characteristic frequency shift of the sensor signal. In the invention presented here, the energy, which is necessary to perform this frequency shift from the frequency range of the read-out signal to the frequency range of the sensor signal is extracted directly from the physical process, which is to be monitored.

The electromagnetic read-out signal is received by the transponder antenna and partly re-emitted. This re-emitted signal is the sensor signal. The amplitude and phasing of this reflection process is determined by the reflection properties of the transponder antenna. The sensor signal is re-emitted immediately. Beside the electromagnetic resonance of the transponder antenna, which is determined by the loaded quality factor of the transponder antenna, no additional energy storing is involved in the process. The loaded quality factor of an antenna determines the swinging out of the electromagnetic signal which is emitted by this antenna after the antenna has been stimulated by a very short impulse. This storing of the read-out signal in the resonance of the antenna itself is by far shorter than the storing which is possible using a surface acoustic wave. Thus this storing is not sufficient to implement a time domain division between the read-out signal and the sensor signal. Therefore, the read-out signal and the sensor signal are received simultaneously in the receiver unit.

Since the novel method and apparatus do not use any time domain division, no surface wave component nor any other component is necessary for the storing energy of the read-out signal. The novel method and apparatus use a frequency domain division between the read-out signal and the sensor signal which therefore can be received simultaneously. The term "simultaneously" or "approximately at the same time" neglects the run time of the read-out signal from the transmitter antenna to the transponder antenna, the very small storing time within the electrical resonant circuitry of the antenna, as well as the run time of the sensor signal from the transponder antenna to the receiver antenna. However, it is typical that these run and storing times are very short in comparison with the duration of the read-out signal. Actually, one can even use a permanent CW signal as the read-out signal, and in this case one also gets a permanent sensor signal.

Since the novel method and apparatus use a frequency domain division, the sensor signal has to be spectrum analyzed. This can be done using a Fourier analysis, or other high resolution spectral analyzing concepts. With this spectrum analysis algorithms the received signal which is received by the receiver antenna can be decomposed into a first part accumulated at the read-out frequency which encloses the read-out signal and all static environmental echoes, and a second part with components whose frequency is shifted away from the read-out signal which encloses Doppler shifted components and other mixed or modulated spectral components, and then fed to an analyzing part of the receiver. Strictly speaking the Doppler effect is doubled because it occurs in the point of the transponder antenna concerning the read-out signal and as well in the point of the transmitting and receiving unit concerning the sensor signal. However, the Doppler effect is not the part of the sensor signal which carries the information of interest here. The measuring signal is rather up-modulated to the Doppler signal, because the back-scattered signal form the transponder antenna will be Doppler shifted, without fail, if the transponder antenna is moving with regard to the transmitter and receiver antennas, and every modulation of the back scattering characteristics may lead to a further frequency shift of this signal.

The modulation of the sensor signal may be achieved by a frequency modulation, a phase modulation, or an amplitude modulation. These modulations cause a frequency shift which separates the sensor signal from the read-out signal in the time domain.

If only this spectral part which is shifted further than the ordinary Doppler shift is evaluated, the time dependence of the physical process which is to be monitored and which affects the sensor and thus changes the value of the electrical impedance of the sensor can be reconstructed again by a transformation into the time domain. For many problems, however, it might be sufficient, to evaluate only the ratios between the fundamental and some higher harmonics of the sensor signal.

The new measurement arrangement is suitable for an on-line measurement of the strain or deformation of a tire element of a vehicle during its contact with the road while the corresponding vehicle is moving. With the knowledge of the strain curve the coefficient of friction of this tire with the road can be estimated.

In order to achieve this modulation of the back-scattered sensor signal, a dynamic change in time of the electrical properties of at least one component which is connected to the transponder antenna or which may be even incorporated into the transponder antenna as an integral part has to be performed by the physical process to be monitored. This can be achieved by deforming the shape of the antenna, thus tuning or modulating their resonant frequency, or by using a tuneable capacitance, inductance, or resistance to build up the sensor with which the transponder antenna is loaded. The sensor element can also have a more complicated structure with a circuit whose electrical characteristics is determined by one or more impedances which are changed by the process to be monitored. However, this is not preferred. Details concerning alternatives in shape of the sensor using a changeable capacitance which is changed by the process to be monitored are disclosed in German patent application No. DE 198 07 0004 A1.

In a preferred embodiment of the novel method and apparatus, the transponder antenna itself also forms the sensor the impedance of which is influenced by a mechanical bending or a strain. This means that a specific type of antenna is used as transponder antenna which is sensitive to a strain or mechanical bending of the shape of the antenna. This strain may change the capacitive, inductive, resistive part, or any combination thereof of the resonant circuit which build up the electrical properties of the antenna, and may thus change its electrical properties, like the resonant frequency, the quality factor, the internal losses, the scattering cross-section and/or the phase of reflection. This preferred embodiment of the invention is adaptable to all physical processes which show a strain or bending which result in a strain or bending, or which can be transformed into a strain or a bending.

The preferred frequency range for the read-out signal is in the UHF and VHF region to reduce the size of the antennas, but the invention is also applicable in all other frequency ranges. In ranges of higher frequencies the Doppler shift may move towards the modulated spectral components, thus complicating the analysis.

A apparatus according to the present invention includes a sensor which has an electrical impedance and which is connected directly to the transponder antenna circuitry, the value of the electrical impedance being changeable so that it can be time dependently changed or modulated by the measurement values to be monitored. As a result, the back-scattering properties of the transponder antenna change according to the time dependently changes of the measurement values to be monitored. If the transponder antenna receives a read-out signal, which has been emitted by a transmitter antenna of a transmitter unit, the transponder antenna will be oscillating according to its quality factor and thereby re-emit a part of this read-out signal. If the electrical impedance of the sensor is changed or modulated by the measurement values to be monitored at the same time, the back-scattered signal part of the transponder antenna is changed with the same time characteristics as well. This modified back-scattered signal component is called the sensor signal or sensor wave. Together with the read-out signal and some environmental radar echoes, the sensor signal is received by the receiver antenna at the same time as the read-out signal is emitted, and analyzed in an analyzing part of the transmitting and receiving unit.

The radio transponder unit including the sensor and the transponder antenna may have a very simple structure. For example, both the sensor and the transponder antenna may be made up of one conductive wire section which is bent to different shapes and which changes at least one of its electrical properties due to the bending. By using such conductive wire sections for monitoring the strain of a tire element during its contact with the roadway while the corresponding vehicle is moving the friction coefficient of this tire with the road can be estimated. Such a sensor tire or "intelligent tire" can easily and economically be produced in series.

As already mentioned above, some basic arrangements and some possible embodiments of the sensor element are disclosed in German patent application No. DE 198 07 004 A1. However, the novel method and apparatus operates without any energy storage unit.

The following calculations are added to further explain the invention. The calculation treats the on-line monitoring of the strain of a tire element during the contact with the road while the corresponding vehicle is moving. With the knowledge of this strain curve, the coefficient of friction of this tire with the roadway can be estimated.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
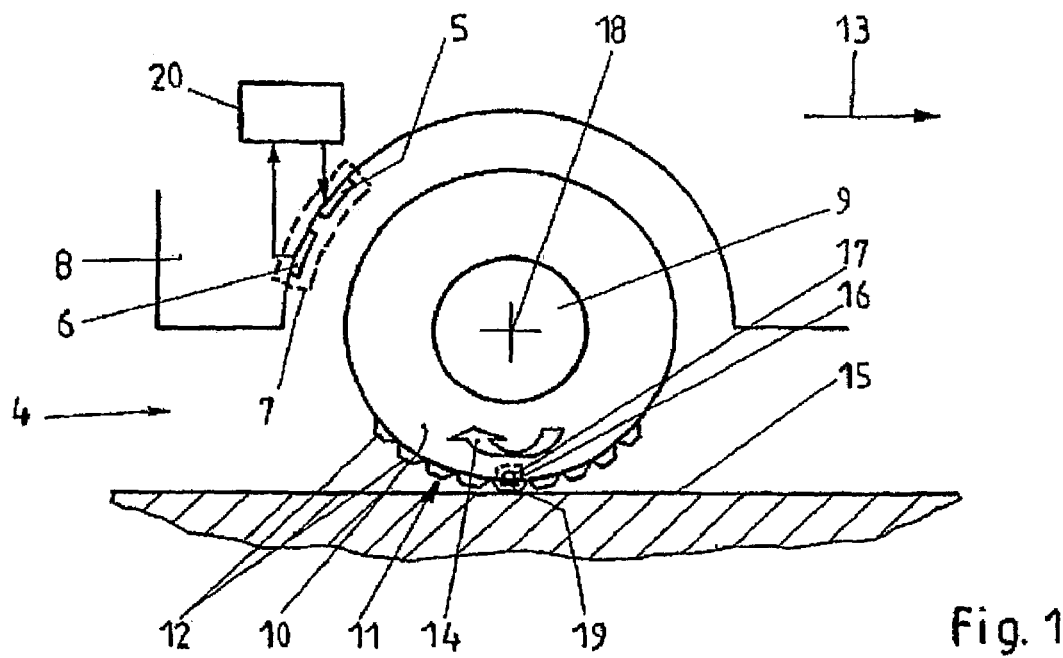
FIG. 1 is a view of a measurement arrangement at a tire of a wheel of a motor vehicle.

Referring now in greater detail to the drawings, FIG. 1 illustrates an apparatus 4 being designed and arranged to measure the strain or deformation of a tire element of a tire 10 of a motor vehicle 8 during its contact with a road 15 while the vehicle 8 is moving. The tire 10 is mounted to a wheel 9 of the motor vehicle 8, and it rotates together with the wheel 9 in the direction of a turning arrow 14 about an axis of rotation 18. Thus, the motor vehicle 8 moves forward in a direction of an arrow 13 (x-axis).

The apparatus 4 includes a transmitting and receiving unit 7 which is fixed to the vehicle behind the wheel 9, of a frequency analyzing unit 20 being associated with the unit 7, and of a transponder unit 19 being arranged within the tire which is read out by radio signals. The transmitting and receiving unit 7 includes a transmitter antenna 5 for emitting an electromagnetic exciting wave or read-out signal, and a receiver antenna 6 for receiving an electromagnetic sensor wave or sensor signal. The transmitter antenna 5 and the receiver antenna 6 can also be realized as one common antenna. The frequency analyzing unit 20 controls the transmitter antenna 7 for emitting the read-out signal and analyses the signal received by the receiver antenna 6 for its frequency or frequency composition.

The sensor signal is back-scattered by the transponder antenna 17 of the transponder unit 19 as a response to the read-out signal and results in an output signal of the receiver antenna 7. The sensor signal is modulated as compared to the read-out signal by the time dependence of an sensor 16 which has an electrical impedance sensitive to the measurement value, and which is connected to the transponder antenna 17, and which thus changes the radar cross section (or radar reflectivity) of the transponder antenna 17 with the time dependence of the process to be measured. The sensor 16 can also be an integrated part of the transponder antenna 17.

The measurement value of interest here is the strain of a tire element 12 of the tire 10. Correspondingly, in this case the sensor is arranged within the tire 10.

It may be assumed that the motor vehicle 8 shows a uniform linear movement in the direction of the arrow 13. Because the antennas 5 and 6 are placed behind the wheel 9, the tire element 12 including the sensor element 16 is moving towards the antennas and generates a Doppler shift during passing through the contact area of the tire 10 with the road 15.

If an arrangement of the antennas 5, 6 in front of the wheel 9 was chosen, the profile element 12 would move away from the antennas 5, 6, thus changing the sing of the Doppler shift. Using an arrangement of the antennas 5, 6 vertical above the contact area, the Doppler shift would become zero. Nevertheless, the measurement method described here would work anyhow. In the following calculations only those movements in the direction of arrow 13 are considered; thus, the antennas may be regarded as being placed at the level of the roadway 15. If the altitude above the roadway 15 would be taken into account, this would not change anything concerning the basic considerations but the formulas would become more complicated.

| | |
|---|---|
| The motor vehicle 8 may be moving with the velocity | $v_{car}$ |
| The tyre 10 may have the radius | r |

This results in an angular velocity $\omega_{wheel}$ of the tire 10 according to the equation:

$$v_{car} = \omega_{wheel} \cdot r \rightarrow \omega_{wheel} = \frac{v_{car}}{r}$$

Case 1: Circular movement of the wheel without consideration of the flatness of the tyre in the contact area.

The x-axis may be parallel to the direction of movement, and the taxis may be that direction from the axis of rotation 18 to the contact area. If the motor vehicle is moving straight on in forward direction, the considered profile element 12 is moving in the x-y-plane. The antennas 5, 6, which are fixed to the motor vehicle 8 are assumed to be on the same level as the surface of the roadway 15. S, $s_x$, $s_y$ are the location and the components of the location, and v, $v_x$, $v_y$ are the velocity and the components of the velocity of the sensor element 16 in the x-y-plane or x-, y-direction with regard to the fixed antennas 5, 6. t is chosen in such a way that the profile element is in the center of the contact area at t=0. $S_0$ is the distance in x-direction between the antennas 5, 6 and the center of the contact area, i.e. $S_0$ is the distance in x-direction between the antennas 5, 6 and the axis of rotation 18 of the tyre 9. This results in:

$$s_x = s_0 + r \cdot \sin(\omega_{wheel} t)$$

$$s_y = r \cdot \cos(\omega_{wheel} t)$$

$$s = \sqrt{s_x^2 + s_y^2} = \sqrt{(s_0 + r \cdot \sin(\omega_{wheel} t))^2 + (r \cdot \cos(\omega_{wheel} t))^2}$$

$$= \sqrt{s_0^2 + r^2 + 2 \cdot s_0 \cdot r \cdot \sin(\omega_{wheel} t)}$$

$$v = \frac{ds}{dt} = \frac{1}{2} \cdot \frac{2 \cdot s_0 \cdot r \cdot \omega_{wheel} \cdot \cos(\omega_{wheel} t)}{\sqrt{s_0^2 + r^2 + 2 \cdot s_0 \cdot r \cdot \sin(\omega_{wheel} t)}}$$

$$= \frac{s_0}{\sqrt{s_0^2 + r^2 + 2 \cdot s_0 \cdot r \cdot \sin(\omega_{wheel} t)}} \cdot v_{car} \cdot \cos(\omega_{wheel} t)$$

The Doppler-shifted frequency $f_d$ of the reflected sensor signal can be calculated using the frequency of the read-out signal $f_0$ and the velocity of light c:

$$f_d = f_0 \cdot \left(1 + 2 \cdot \frac{v}{c}\right)$$

$$= f_0 \cdot \left(1 + 2 \cdot \frac{v_{car}}{c} \cdot \frac{s_0}{\sqrt{s_0^2 + r^2 + 2 \cdot s_0 \cdot r \cdot \sin(\omega_{wheel} t)}} \cdot \cos(\omega_{wheel} t)\right)$$

The maximum of the Doppler shift occurs in those two positions in which a straight line connecting the antennas 5, 6, which are fixed to the motor vehicle, and the transponder antenna 17 form a tangent to the wheel, i.e.:

$$\omega_{wheel} t = \arcsin\left(\frac{r}{s_0}\right) + n \cdot 2\pi$$

EXAMPLE $f_0$=1 GHz, $v_{car}$=100 km/h. This results into a maximum Doppler shift of $f_d - f_0$=92.5 Hz, Which can be measured easily by a CW-radar as can be seen from police speed measurements.

In the following, only the movement of the transponder unit along the x-axis will be considered to simplify the calculations. The above equations are thus simplified to:

$$s_x = s_0 + r \cdot \sin(\omega_{wheel} t)$$

$$v_x = \frac{ds_x}{dt} = r \cdot \omega_{wheel} \cdot \cos(\omega_{wheel} t) = v_{car} \cdot \cos(\omega_{wheel} t)$$

$$f_d = f_0 \cdot \left(1 + 2 \cdot \frac{v_x}{c}\right) = f_0 \cdot \left(1 + 2 \cdot \frac{v_{car}}{c} \cdot \cos(\omega_{wheel} t)\right)$$

Case 2: Circular movement of the wheel with consideration of the flatness of the tire 10 in the contact area.

While passing through the contact area, the profile element 12 is no more moving circularly but linearly. Because the secant is shorter than the circular arc, a strain of the tire 10 results with a bulge both in the running in area and in the running out area. If a circular movement is subtracted from the corresponding movement of the profile element, the movement shown in FIG. 2 and denoted with x remains.

The curve denoted with x is now approximated with a sinus curve for further simplifying the calculations.

The maximum strain (approximately 0.45 mm in FIG. 2) is denoted with $A_{contact}$.

The length of the contact area (2a and 2b in FIG. 2) is denoted with $L_{contact}$.

The total length of the sinus curve, which is an approximation of the actual strain of the profile element, is approximately given by $2 \ast L_{contact}$.

The corresponding frequency $f_{contact}$ and the angular frequency $\omega_{contact}$ of the movement through the contact areas can be derived from the fact that the motor vehicle 8 goes through the length $2 \ast L_{contact}$ with its velocity $V_{car}$:

$$v_{car} = f_{contact} \cdot 2 \cdot L_{contact} \rightarrow f_{contact} = \frac{v_{car}}{2 \cdot L_{contact}}$$

$$\rightarrow \omega_{contact} = 2 \cdot \pi \cdot f_{contact} = \frac{\pi \cdot v_{car}}{L_{contact}}$$

The movement $s_x$ of the sensor 16 with regard to the fixed antennas 5, 6 in x-direction is given by:

$$s_x = \begin{cases} s_0 + r \cdot \sin(\omega_{wheel}t) + A_{contact} \cdot \sin(\omega_{wheel} \cdot t) & \text{for } -\frac{L_{contact}}{v_{car}} \leq t - n \cdot \frac{2 \cdot \pi \cdot r}{v_{car}} \leq +\frac{L_{contact}}{v_{car}}, n \in N_0 \\ s_0 + r \cdot \sin(\omega_{wheel}t) & \text{otherwise} \end{cases}$$

Figure 2:
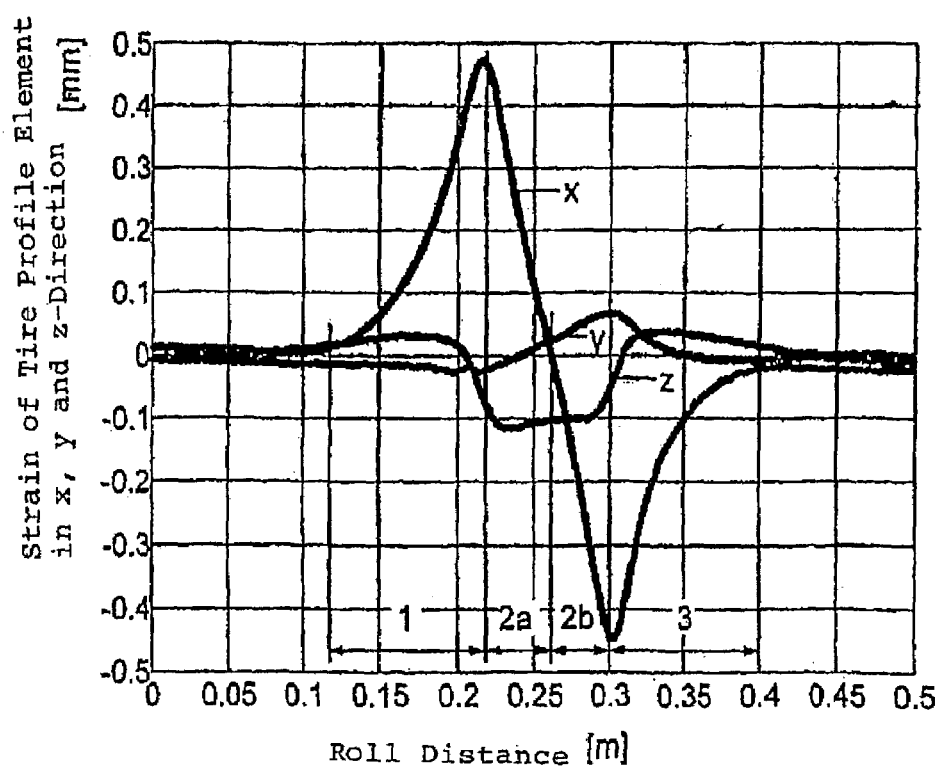
FIG. 2 is a view of the strain of a tire element of a free running wheel during its contact with the road while the corresponding vehicle is moving straight.

Any time when the profile element 12 moves through the area $\pm L_{contact}$ around the centre of the contact area, the specific movement due to the strain of the profile element 12, which is shown in FIG. 2 and denoted with x there, is added to the circular movement of the profile element 12. The sign is given by the fact, that the strain points away from the antennas 5, 6 in the first part of the contact area, which is the accelerating area, and then points towards the antennas 5, 6, in the second part of the contact area, which is the decelerating part. This means, that the ordinary movement of the tire element is delayed in the running in area due to the bulge. At the time t=0 the tire element 12 is again located at the distance $s_0$ in the middle of the contact area.

The velocity $v_x$ is given by:

$$v_x = \begin{cases} r \cdot \omega_{wheel} \cdot \cos(\omega_{wheel}t) + A_{contact} \cdot \omega_{contact} \cdot \cos(\omega_{contact} \cdot t) & \text{for } -\frac{L_{contact}}{v_{car}} \leq t - n \cdot \frac{2 \cdot \pi \cdot r}{v_{car}} \leq +\frac{L_{contact}}{v_{car}}, n \in N_0 \\ r \cdot \omega_{Reifen} \cdot \cos(\omega_{Reifen}t) & \text{otherwise} \end{cases}$$

Thus, the Doppler is given by:

$$f_d = f_0 \cdot \left(1 + 2\frac{v_x}{c}\right)$$

$$= f_0 \cdot \begin{cases} 1 + 2\frac{r \cdot \omega_{wheel} \cdot \cos(\omega_{wheel}t) + A_{contact} \cdot \omega_{contact} \cdot \cos(\omega_{contact} \cdot t)}{c} \\ \overline{1 + 2\frac{r \cdot \omega_{wheel} \cdot \cos(\omega_{wheel}t)}{c}} \\ \text{for } -\frac{L_{contact}}{v_{car}} \leq t - n \cdot \frac{2 \cdot \pi \cdot r}{v_{car}} \leq +\frac{L_{contact}}{v_{car}} \\ \text{otherwise} \end{cases}$$

-continued $$= f_0 \cdot \begin{cases} \dfrac{1 + 2\frac{v_{car}}{c} \cdot \cos(\omega_{wheel}t) + 2\frac{\pi \cdot A_{contact}}{L_{contact}} \cdot \frac{v_{car}}{c} \cdot \cos(\omega_{contact} \cdot t)}{1 + 2\frac{v_{car}}{c} \cdot \cos(\omega_{wheel}t)} \\ \text{for } -\frac{L_{contact}}{v_{car}} \leq t - n \cdot \frac{2 \cdot \pi \cdot r}{v_{car}} \leq +\frac{L_{contact}}{v_{car}} \\ \text{otherwise} \end{cases}$$

As a result, there are two portions of the Doppler shift, the amplitude of the strain of a tyre element being by the factor $\pi \ast A_{contact}/L_{contact}$ smaller than the contribution of the turning of the wheel.

EXAMPLE $L_{contact}$=8 cm (see FIG. 2) and $A_{contact}$=0.45 mm Thus the Doppler shift is increased by approximately 1.8%, which is very hard to detect.

By processing of the Doppler shift alone no significant measurement signal describing the conditions of during passing the contact area can be extracted. Although the frequency $\omega_{Latsch}$ is clearly higher than the turning frequency of the wheel $\omega_{wheel}$, the amplitude $A_{contact}$ is also significant smaller as compared to the radius of the wheel r.

Case 3 Circular movement of the wheel with consideration of the modulated back scattering process.

According to the invention, the strain $A_{contact} \cdot \sin(\omega_{contact} \cdot t)$ is now transformed into a modulation of the frequency of the back-scattered sensor signal. To this end, the electrical parameters of a frequency determining element of the sensor, e.g. a part of the transponder antenna 17, or any load of the transponder antenna 17, is altered at the angular frequency $\omega_{contact}$. This can be achieved by deforming the shape of the antenna due to the strain of a tire element, thus tuning (or modulating) their resonant frequency, or, by using a strain gauge, like a tuneable capacitance, inductance, or resistance, to implement the sensor 16 as a load of the transponder antenna 17. Thus, the circuitry, which is provided by the transponder antenna 17 and the sensor 16 includes at least one element Z(t) the electrical impedance Z of which is changing due to the strain of the tire element. The back-scattered sensor signal thus contains at least one component with the same time dependence as Z(t). The spectrum of this component corresponds to the spectral composition of Z(t) and thus to those of the strain of the tire element.

If the electrical impedance of the load Z(t) is altered between open and short while the profile element passes the contact area, or if the resonance frequency of the antenna is altered by the fraction $f_0/Q$, Q giving the quality factor of the transponder antenna 17, the phase of the back scattered sensor signal is changed by ±180°, which corresponds to a shift of a "reflector mirror" by a distance of ±λ/2. Here, λ is the electromagnetic wave length of the sensor signal: $\lambda = c/f_0$. The sensor signal which is modulated in this way can be regarded as a signal which is Doppler-shifted by the frequency $f_{Latsch}$, the amplitude $A_{contact}$ of which, however, is λ/2π:

$$f_0 = \begin{cases} f_0 + 2v_{car}\left(\dfrac{f_0}{c} \cdot \cos(\omega_{wheel}t) + \dfrac{c/f_0}{2 \cdot L_{contact}} \cdot \dfrac{f_0}{c} \cdot \cos(\omega_{contact} \cdot t)\right) \\ f_0\left(1 + 2\dfrac{v_{car}}{c} \cdot \cos(\omega_{wheel}t)\right) \end{cases}$$

$$\text{for } -\dfrac{L_{contact}}{v_{car}} \leq t - n \cdot \dfrac{2 \cdot \pi \cdot r}{v_{car}} \leq +\dfrac{L_{contact}}{v_{car}}$$
else $$= \begin{cases} f_0 + 2v_{car}\left(\dfrac{1}{\lambda} \cdot \cos(\omega_{wheel}t) + \dfrac{1}{2 \cdot L_{contact}} \cdot \cos(\omega_{contact} \cdot t)\right) \\ f_0\left(1 + 2\dfrac{v_{car}}{c} \cdot \cos(\omega_{wheel}t)\right) \end{cases}$$

$$\text{for } -\dfrac{L_{contact}}{v_{car}} \leq t - n \cdot \dfrac{2 \cdot \pi \cdot r}{v_{car}} \leq +\dfrac{L_{contact}}{v_{car}}$$
else Hence, the shift of the sensor signal generated by the modulation of at least one electrical parameter of the back-scatter with the aid of the strain of the tire profile element with regard to the Doppler shifted signal will be in the order of the ratio of $1/L_{contact}$ to $1/\lambda$. Therefore, the coefficient/$(2 \cdot L_{contact})$ gives the relation between the sensor signal representing the strain of a tire profile element and the Doppler-shifted back-scattered signal.

A typical example: $L_{contact}$=8 cm (see FIG. 2). Using the international ISM bands (ISM=industrial, scientific, and medicine), the following results are achieved:

| Frequency $f_0$ | Wave length λ | Relative distant of the modulated signal and the Doppler shifted one $\left(=\dfrac{\lambda}{2 \cdot L_{Latsch}}\right)$ |
|---|---|---|
| 433 MHz | 70 cm | 4.3 |
| 869 MHz | 35 cm | 2.2 |
| 2.45 GHz | 12 cm | 0.76 |
| 5.6 GHz | 5.3 cm | 0.33 |
| 19 GHz | 1.5 cm | 0.1 |
| 73 GHz | 0.4 cm | 0.02 |

The absolute distance between the sensor signal characterizing the strain of a tire profile element and the Doppler-shifted back-scattered signal remains the same, but their ratio decreases with increasing frequency.

If the electrical impedance Z(t) is changed by only a small amount due to the strain of a tire profile element, the corresponding "reflector mirror" will be shifted by a smaller amount than λ/2. In this case the back-scattered signal can be decomposed into a first part with no change due to the strain at all, and a second part the phase of which changes by ±180°. The second component again has the same spectral composition like Z(t). Consequently, in this case not the spectral composition of the modulated back-scattered signal is changed but only the amplitude of the signal generated by a modulation of at least one electrical parameter of the back-scatter with the aid of the strain of a tire profile element. If, for example, the back-scattered signal will be changed due to the variation of the electrical parameter Z(t) in amplitude or phase by only 1%, then the modulated part of the whole signal will be 1/100, or −20 dB of the full amount of the back-scattered signal. The modulation shift, however, is still $f_{Latsch} = \omega_{Latsch}/2\pi$.

The total spectral composition of the back-scattered signal will again be $f_d$, with:

$$f_d = f_0 \cdot \left(1 + 2\dfrac{v_x}{c}\right) \pm f_{contact}$$

$$= f_0 + 2v_{car} \cdot \left(\dfrac{f_0}{c} \pm \dfrac{1}{4 \cdot L_{contact}}\right)$$

Thus, the same formula as above results.

With the novel method and apparatus, not only the fundamental of the signal generated by a modulation of at least one electrical parameter of the back-scatter is monitored with the help of the strain of a tire profile element, which is denoted with x in FIG. 2, but also higher harmonics of this signal may be monitored. The ratios of the higher harmonics to the fundamental signal contain the desired information about the actual shape of the strain of a tire profile element 12, which gives the information about the tire on the road friction coefficient, and also information about local slipping processes of single profile elements 12 during the roadway contact. The frequency shift of this higher harmonics is yet higher than the frequency shift of the fundamental.

The above calculations show that frequencies in the UHF and VHF region up to some 6 GHz are well suited for the described measurement method to monitor the strain of a tire profile element.

Many variations and modifications may be made to the preferred embodiments of the invention without departing substantially from the spirit and principles of the invention. All such modifications and variations are intended to be included herein within the scope of the present invention, as defined by the following claims.

I claim:

1. A method of acquiring data of dynamic physical processes via a radio link, said method comprising the steps of:
arranging a sensor having an electrical impedance which depends on the data to be acquired;
arranging a transponder antenna having an electrical impedance;
connecting the sensor directly to the transponder antenna such that the sensor changes the electrical impedance of the transponder antenna with every variation of the data to be acquired;
exciting the transponder antenna by an electromagnetic exciting wave at the resonance frequency of the transponder antenna to produce an electromagnetic wave being back-scattered by the transponder antenna and being modulated by the sensor;
receiving the electromagnetic wave being back-scattered by the transponder antenna approximately at the same time as the transponder antenna is excited by the electromagnetic exciting wave; and
analyzing the electromagnetic wave being back-scattered by the transponder antenna with respect to the modulation by the sensor.

2. The method of claim 1, wherein the value of the electrical impedance of the transponder antenna is changed by the data to be acquired in a time dependent way such that the changed impedance changes the back-scattering properties of the transponder antenna which modulates the back-scattered sensor wave with the same time characteristics as the time characteristics of the data to be acquired.

3. The method of claim 2, wherein the value of the electrical impedance of the transponder antenna is modulated.

4. The method of claim 1, wherein the sensor is a passive sensor.

5. The method of claim 2, wherein the sensor is a passive sensor.

6. The method of claim 1, wherein the electromagnetic wave is analyzed with respect to the ratio of amplitudes of at least two frequency components.

7. The method of claim 1, wherein the sensor wave is analyzed with respect to a frequency modulation.

8. The method of claim 1, wherein the sensor wave is analyzed with respect to an amplitude modulation.

9. The method of claim 1, further comprising the steps of:
arranging the sensor and the transponder antenna in a radio sensor unit;
arranging the radio sensor unit at an object rotating about an axis of rotation;
arranging a transmitting and receiving unit in a stationary way such that it does not rotate with the object; and
transmitting the exciting wave and receiving the back-scattered sensor wave by the transmitting and receiving unit.

10. The method of claim 9, wherein the data to be acquired is the strain of a tire element of a tire of a vehicle during its contact with a road while the vehicle is moving.

11. The method of claim 1, wherein the sensor has one of an electrical capacitance, an inductance and a resistance the electrical value of which is changed by the data to be acquired in a time dependent way.

12. The method of claim 1, wherein the sensor has one of an electrical capacitance, an inductance and a resistance the electrical value of which is modulated by the data to be acquired in a time dependent way.

13. The method of claim 1, wherein the sensor is connected to a base of the transponder antenna as a load.

14. The method of claim 1, wherein the sensor is integrated into a resonant circuitry of the transponder antenna.

15. The method of claim 14, wherein the transponder antenna also fulfills the function of the sensor element by changing its back-scattering properties due to mechanical bending.

16. The method of claim 1, wherein the exciting frequency is emitted within a frequency range of approximately 100 MHz to 6 GHz.

17. An apparatus for acquiring data of dynamic physical processes via a radio link, comprising:
a transmitter antenna being designed and arranged to emit an electromagnetic exciting wave;
a transponder antenna having an electrical impedance and being designed and arranged to receive the exciting wave;
a sensor having an electrical impedance depending on the data to be acquired, said sensor being directly connected to said transponder antenna in a way that said sensor changes the electrical impedance of said transponder antenna with every variation of the data to be acquired;
a receiver antenna being designed and arranged to receive a back-scattered electromagnetic sensor wave being modulated by said sensor approximately at the same time as said transmitter antenna emits the exciting wave; and
an analysis unit being designed and arranged to analyze the received sensor wave.

18. The apparatus of claim 17, wherein the value of the electrical impedance of said transponder antenna is changed by the data to be acquired in a time dependent way such that the changed impedance changes the back-scattering properties of said transponder antenna which modulates the back-scattered sensor wave with the same time characteristics as the time characteristics of the data to be acquired.

19. The apparatus of claim 18, wherein the value of the electrical impedance of said transponder antenna is modulated.

20. The apparatus of claim 17, wherein said sensor is designed as a passive sensor.

21. The apparatus of claim 18, wherein said sensor is designed as a passive sensor.

22. The apparatus of claim 17, wherein said sensor is arranged in a profile area of a tire of a vehicle.

23. The apparatus of claim 17, wherein said sensor is arranged in a tire element being located in a running zone of a tire of a vehicle.

24. The apparatus of claim 17, wherein said sensor and said transponder antenna are both designed to form one section of a conductive wire being bent to different shapes.

25. A system for determining the deformation of a rotating tire of a motor vehicle, comprising:
a transmitter element being designed and arranged to emit an electromagnetic exciting wave;
a transponder antenna having an electrical impedance and being designed and arranged to receive the exciting wave;
a sensing element having an electrical impedance depending on the data to be acquired, said sensing element being directly connected to said transponder antenna in a way that said sensing element changes the electrical impedance of said transponder element with every variation of the data to be acquired;
a receiver element being designed and arranged to receive a back-scattered electromagnetic sensor wave being modulated by said sensing element approximately at the same time as said transmitter element emits the exciting wave; and
an analysis unit being designed and arranged to analyze the received sensor wave.

26. The system of claim 25, wherein the value of the electrical impedance of the transponder element is changed by the data to be acquired in a time dependent way such that the changed impedance changes the back-scattering properties of the transponder element which modulates the back-scattered sensor wave with the same time characteristics as the time characteristics of the data to be acquired.

27. The system of claim 16, wherein the value of the electrical impedance of the transponder antenna is modulated.

28. The system of claim 25, wherein the sensing element is a passive sensor.

29. The system of claim 26, wherein the sensing element is a passive sensor.

30. The system of claim 25, wherein the sensor wave is analyzed with respect to one of the ratio of amplitudes of at least two frequency components, a frequency modulation, and an amplitude modulation.

* * * * *